(12) United States Patent
Jacoby, Jr.

(10) Patent No.: US 7,421,403 B2
(45) Date of Patent: Sep. 2, 2008

(54) COMPUTERIZED COMMISSION BASED TRADING OPERATIONS

(75) Inventor: Theodore C. Jacoby, Jr., Sunset Hills, MO (US)

(73) Assignee: T.C. Jacoby & Company, Inc., St. Louis, MO (US)

( * ) Notice: Subject to any disclaimer, the term of this patent is extended or adjusted under 35 U.S.C. 154(b) by 574 days.

(21) Appl. No.: 11/064,669

(22) Filed: Feb. 24, 2005

(65) Prior Publication Data

US 2005/0144116 A1    Jun. 30, 2005

Related U.S. Application Data

(62) Division of application No. 09/773,803, filed on Feb. 2, 2001, now abandoned.

(51) Int. Cl.
*G06Q 30/00* (2006.01)

(52) U.S. Cl. .................... 705/26; 705/1; 705/37; 705/80

(58) Field of Classification Search .......... 705/1, 705/26, 37, 80
See application file for complete search history.

(56) References Cited

U.S. PATENT DOCUMENTS

| | | | |
|---|---|---|---|
| 5,666,493 A | 9/1997 | Wojcik et al. | |
| 5,842,178 A | 11/1998 | Giovannoli | |
| 7,130,802 B1 * | 10/2006 | Mehregany et al. | 705/1 |
| 2001/0032165 A1 * | 10/2001 | Friend et al. | 705/37 |
| 2002/0038280 A1 * | 3/2002 | Levy | 705/37 |
| 2002/0049645 A1 | 4/2002 | Takahashi | |
| 2002/0069156 A1 | 6/2002 | Adam et al. | |
| 2006/0015413 A1 * | 1/2006 | Giovannoli | 705/26 |

FOREIGN PATENT DOCUMENTS

WO      0173671      10/2001

OTHER PUBLICATIONS

Dairy.com—19 pgs. Printed from internet
US 6,047,266, 04/2000, Van Horn et al. (withdrawn)

* cited by examiner

*Primary Examiner*—Yogesh C Garg
(74) *Attorney, Agent, or Firm*—Polster, Lieder, Woodruff & Lucchesi

(57) ABSTRACT

A computerized information storage, filtering and presentation system configured to facilitate the function of intermediary broker agents in the purchasing and sale of consumable and perishable products, such as dairy goods. The computerized system provides agents of the intermediary broker with filtered information via a communications network identifying the sellers of particular goods, current market purchase prices, and transportation costs for various regions. The computerized system further provides the agents with additional filtered information via the communications network identifying buyers for particular goods and current market selling prices, enabling the agents to efficiently match goods purchased from a seller to a buyer's demand while achieving a desired profit margin.

13 Claims, 16 Drawing Sheets

```
┌─────────────────────────────────────────────────────────────┐
│ ☐ CONTACTS PERSON DETAIL                                    │
│ ┌──┐┌──┐                                                    │
│ │📧││🖨️│           MR. TED JACOBY                            │
│ └──┘└──┘                              CODE: TCJJR           │
│  ADDRESS: [CORPORATE ▽]              CATEGORY:              │
│           3701 SOUTH LINDBERGH         STATUS: ACTIVE       │
│           ST. LOUIS, MO 63127     LAST UPDATE BY: SYS       │
│           USA                        LAST UPDATE: 11/06/2000│
│                                                             │
│  JOB TITLE: PRESIDENT          XMAS GIFT STATUS:            │
│  BIRTHDAY:                                                  │── 28
│                                                             │
│           CORPORATE COMMUNICATION                           │
│     ┌─────────────────────────────────────────┐             │
│     │ TYPE              VALUE        REMARKS  │             │
│     │ BUSINESS FAX      314-821-3251          │             │
│     │ MAIN BUSINESS PHONE 314-821-4456        │             │
│     │ SECONDARY BUSINESS PHONE 800-325-9556   │             │
│     └─────────────────────────────────────────┘             │
│                                                             │
│            PERSONAL COMMUNICATION                           │
│     ┌─────────────────────────────────────────┐             │
│     │ TYPE      VALUE            REMARKS      │             │
│     │ BUS PHONE 314-821-4456                  │             │
│     │ EMAIL     TED@JACOBY.COM                │             │
│     │ FAX #     314-909-2045                  │             │
│     └─────────────────────────────────────────┘             │
└─────────────────────────────────────────────────────────────┘
```

F I G . 4

```
┌──────────────────────────────────────────────────────────────────────┐
│ THE TRADER SYSTEM                                                    │
│ HOME | INQUIRY | MAINTENANCE | SETTLEMENT | SETTINGS | NEWS | LOGOUT | ABOUT │
│ ┌──┐┌──┐  │ CONTACTS | SCHEDULES | PRODUCTS | PRICING | TRANSPORTATION │── 32
│ [TJC   ]  │ 1 BUYERS/  │ ┌────┐ T.C. JACOBY & COMPANY, INC.          │
│ ☑ CODE    │ SELLERS FOUND│ ADDRESS:                    CODE: TCJ     │
│ ⊙ COMPANY │ T.C.JACOBY │ [CORPORATE ▽]               CATEGORY:       │
│ ○ PERSON  │ & CO., INC.│ 3701 SOUTH LINDBERGH        STATUS: ACTIVE  │
│ [CONTACT TYPE]│        │ ST. LOUIS, MO 63127   LAST UPDATE BY: TCJ   │
│ [BUYERS/SELLERS▽]│ ST. LOUIS,│ USA                 LAST UPDATE:     │
│ [STATUS ]  │    MO      │                              11/20/2000    │
│ [ACTIVE▽]  │            │ BUSINESS RISK: NO    PLANT CAPACITY: 0    │
│ [CATEGORY]│    30       │ LAST CONF NO: TCJ477-007  ZONE DIFF: 0    │
│ [ ALL  ▽]  │            │ TERMS:                     FED ORDER NO:  │
│ [FAVORITES]│            │         CORPORATE COMMUNICATION           │
│            │            │ TYPE                VALUE       REMARKS   │
│ [ FIND  ]  │            │ BUSINESS FAX:       314-821-3251          │
│            │            │ MAIN BUSINESS PHONE: 314-821-4456         │
└──────────────────────────────────────────────────────────────────────┘
```

THE TRADER SYSTEM

HOME | INQUIRY | MAINTENANCE | SETTLEMENT | SETTINGS | NEWS | LOGOUT | ABOUT

CONTACTS | SCHEDULES | PRODUCTS | PRICING | TRANSPORTATION | 32

TJC
☑ CODE
⊙ COMPANY
○ PERSON
CONTACT TYPE
BUYERS/SELLERS ▽
STATUS
ACTIVE ▽
CATEGORY
ALL ▽
FAVORITES
[FIND]

1 BUYERS/SELLERS FOUND

T.C. JACOBY & CO., INC.
ST. LOUIS, MO

30

| TYPE | VALUE | REMARKS |
|---|---|---|
| BUSINESS FAX: | 314-821-3251 | |
| MAIN BUSINESS PHONE: | 314-821-4456 | |
| SEC. BUSINESS PHONE: | 800-325-9556 | |

| NAME | TITLE |
|---|---|
| DR. MIGUEL GARCIA-WINDER | VP INT'L MARKETING |
| MR. TED JACOBY | PRESIDENT |

FIG. 5C

THE TRADER SYSTEM    33  35 37 41 43 45

HOME | INQUIRY | MAINTENANCE | SETTLEMENT | SETTINGS | NEWS | LOGOUT | ABOUT

CONTACTS | SCHEDULES | PRODUCTS | PRICING | TRANSPORTATION | 32

XXX
☑ CODE
⊙ COMPANY
○ PERSON
CONTACT TYPE
BUYERS/SELLERS ▽
STATUS
ACTIVE ▽
CATEGORY
▽
FAVORITES
[FIND]

○ UDDERLY DELICIOUS DAIRY
⊞ ○ UDD MILK HAULING
  - ○ UDD MEXICO
⊞ - ○ UDD TEXAS
  - @ MR. JAMES UDDERLY
  - @ MR. JERRY JERSEY
  - @ MR. JOHN UDDERLY
  - @ MS. DIANE GUERNSEY

30

UDDERLY DELICIOUS DAIRY

ADDRESS:
BILL TO ▽
123 MAIN ST.
SUITE 666
SPRINGFIELD,
MO 66666
USA

CODE: XXX
CATEGORY: MILK PRODUCER
STATUS: ACTIVE
LAST UPDATE BY: DMD
LAST UPDATE: 11/08/2000

BUSINESS RISK: NO     PLANT CAPACITY: 0
LAST CONF NO:          ZONE DIFF: 0
TERMS: NET 30          FED ORDER NO:

CORPORATE COMMUNICATION

| TYPE | VALUE | REMARKS |
|---|---|---|
| ADD. BUS. PHONE | 636-123-4568 | |
| CO. EMAIL ADDRESS | QUESTIONS@UDDERLYDELICIOUS.COM | |
| CORP. WEB SITE | WWW.UDDERLYDELICIOUS.COM | |
| MAIN BUS. FAX | 636-123-7654 | |
| MAIN BUS. PHONE | 636-123-4567 | |

REMARKS
THIS COMPANY IS FOR DEMO PURPOSES ONLY

| NAME | TITLE |
|---|---|
| MS. DIANE GUERNSEY | ACCOUNTING |
| MR JERRY JERSEY | PROCUREMENT |

ATTACHMENT FILE LIST

ALL CATEGORIES ▽

| DESCRIPTION | CATEGORY | TYPE | FROM DATE | TO DATE | REMARKS |
|---|---|---|---|---|---|
| LETTER CONFIRMING HAUL RATES | CORRESPONDENCE | WORD | 11/13/00 | 11/13/00 | |
| PHONE CONVERSATION JOURNAL | JOURNAL | WORD | 1/1/00 | 12/31/00 | |
| UMKOSHER CERTIFICATE | KOSHER-CERTIFICATES | IMAGE | 2/1/00 | 1/31/01 | |
| UMKOSHER CERTIFICATE | KOSHER-CERTIFICATES | IMAGE | 2/1/98 | 1/31/00 | |
| UMKOSHER CERTIFICATE | KOSHER-CERTIFICATES | IMAGE | 2/1/98 | 1/31/99 | |
| HAULING CALCULATIONS | SPREAD-SHEETS | EXCEL | 11/13/00 | 11/13/00 | |

THE TRADER SYSTEM

HOME | INQUIRY | MAINTENANCE | SETTLEMENT | SETTINGS | NEWS | LOGOUT | ABOUT

☐☐ | CONTACTS | SCHEDULES | PRODUCTS | PRICING | TRANSPORTATION |

◉ DETAIL VIEW ○ REMARKS VIEW ○ CONFIRMATION VIEW   SELECTION CRITERIA

SCHEDULES SELECTION CRITERIA

SCHEDULES FOR
TCJ
☑ CODE ☐
◉ BUYERS/SELLERS
○ HAULERS

SHIP DATES
FROM DATE
11/13/2000 ☐
TO DATE
12/16/2000 ☐

SCHEDULE TYPE
◉ BOTH
○ SHIP FROM
○ SHIP TO

ALT CONTACT
☑ CODE ☐

PRODUCT
☑ CODE ☐

TRADER

REMARKS

FIG. 6

THE TRADER SYSTEM

HOME | INQUIRY | MAINTENANCE | SETTLEMENT | SETTINGS | NEWS | LOGOUT | ABOUT
CONTACTS | SCHEDULES | PRODUCTS | PRICING | TRANSPORTATION

⊙ DETAIL VIEW   ○ REMARKS VIEW   ○ CONFIRMATION VIEW   SELECTION CRITERIA

123 SCHEDULE(S) FOUND

SCHEDULES FOR T.C. JACOBY & COMPANY, INC.

| CONF NO. | STATUS | SHIP FROM | FROM CITY | SHIP DATE | SHIP TIME | PRODUCT | LOAD TYPE | CARRIER | SHIP TO | TO CITY | ARRIVE DATE |
|---|---|---|---|---|---|---|---|---|---|---|---|
| SEM-186-001 (0012) | APPROVED | SELLERS OPTION | SELLERS OPTION | FRIDAY 12/8/00 | N/A | WHOLE MILK FO CLASS III GRADE A COOLED DOWN (WH02) | STANDING ORDER AUTO EXTEND (MIRROR WEEK) | MTS | T.C. JACOBY & COMPANY, INC. | ST. LOUIS | FRIDAY 12/8/00 |

FIG. 7

```
SCHEDULES DETAIL
         DETAIL FOR CONFIRMATION NUMBER FDA027-003 (0002)
       STATUS: APPROVED
    LOAD TYPE: SPOT LOAD
      PRODUCT: WHEY PROTEIN CONCENTRATE
               34% KISHER, EXTRA GRADE
      CARRIER: BYRS OPT
    BUY FROM: FIRST DISTRICT ASS'N      SELL TO: T.C. JACOBY
    SHIP FROM: FIRST DISTRICT ASS'N              & COMPANY, INC.
    FROM CITY: LITCHFIELD               SHIP TO: R & L ENTERPRISES
    SHIP DATE: SUNDAY 12/3/00           TO CITY: ST. LOUIS
    SHIP TIME: N/A                   ARRIVE DATE: TUESDAY 12/5/00
   MIN WEIGHT: 0                     ARRIVE TIME: N/A
   EST WEIGHT: 45,000                CONFIRMED BY: MJH
     EST TEST: 0%                   CONFIRMED DATE:              36
   SETTLED WT: 0                      TRADE AUTH: MJH
 SETTLED TEST: 0%                   BILL OF LADING:
                                    PT-TO-PT MILES: 0
                                                                    38
   | TCJ PO 1647-2                                           |
                      PRICING INFORMATION
   WPC &.7325 + $.00 = &.7325/LKB BP *HAUL RATE IS NOT KNOWN* = *N.A.*
```

THE TRADER SYSTEM

HOME | INQUIRY | MAINTENANCE | SETTLEMENT | SETTINGS | NEWS | LOGOUT | ABOUT

CONTACTS | SCHEDULES | PRODUCTS | PRICING | TRANSPORTATION |

13 PRODUCT(S) FOUND

| CODE | DESCRIPTION | STD COMMISSION | UNIT OF MEASURE | BUYERS | SELLERS | HAULERS |
|---|---|---|---|---|---|---|
| DB03 | BAKERY BLEND BAKERY BLEND 425 | 0 | POUNDS | BUYERS | SELLERS | HAULERS |
| DB01 | BUTTERMILK/WHEY PROTEIN BLEND | 0 | POUNDS | BUYERS | SELLERS | HAULERS |
| DBCH | CHEESE BLEND DRY CHEESE BLEND | 0 | POUNDS | BUYERS | SELLERS | HAULERS |
| DBWC | CHEESE BLEND DRY WHITE CHEESE BLEND | 0 | POUNDS | BUYERS | SELLERS | HAULERS |
| DB55 | DAIRY BLEND EMSER 555 (HYDROLIZED MILK PROTEIN) | 0.0025 | POUNDS | BUYERS | SELLERS | HAULERS |

Sidebar: NAME/CODE, □ CODE, CATEGORY, BLENDS ▽, FIND

FIG. 11

THE TRADER SYSTEM

HOME | INQUIRY | MAINTENANCE | SETTLEMENT | SETTINGS | NEWS | LOGOUT | ABOUT

CONTACTS | SCHEDULES | PRODUCTS | PRICING | TRANSPORTATION |

2 BUYER(S) FOUND

BACK  □ BUYERS/SELLERS BY STATE

| NAME | CITY | STATE | LAST CONFIRM DATE | HISTORY |
|---|---|---|---|---|
| FOOD SYSTEMS | BATON ROUGE | LA | 11/1/99 | PRICING |
| T.C. JACOBY & COMPANY, INC. | ST. LOUIS | MO | 11/1/99 | PRICING |

Sidebar: NAME/CODE, □ CODE, CATEGORY, BLENDS ▽, FIND

FIG. 12

| THE TRADER SYSTEM | | | | | | | |
|---|---|---|---|---|---|---|---|
| HOME \| INQUIRY \| MAINTENANCE \| SETTLEMENT \| SETTINGS \| NEWS \| LOGOUT \| ABOUT | | | | | | | |
| ☐☐ 42A | CONTACTS \| SCHEDULES \| PRODUCTS \| PRICING \| TRANSPORTATION | | | | | | |
| | MARKET PRICES \| PRICING HISTORY \| CALCULATOR \| OTHER LINKS | | | | | | |
| PRICE BASIS | 97 MARKET PROCE(S) FOUND   42B   42C   42D | | | | | | |
| | CURRENT MARKET PRICES | | | | | | |
| ☑ CODE | PRICE BASIS | DESCRIPTION | EFFECTIVE FROM | EFFECTIVE TO | MARKET PRICE | LAST UPDATE | UPDATED BY |
| FIND | F051 | APPALACHIAN FEDERAL ORDER #5 CLASS 1 PRICE | 11/01/00 | 99/99/99 | 14.92 | 10/20/00 | JLW |
| | F131 | ARIZONA-LAS VEGAS FEDERAL ORDER #131 CLASS 1 PRICE | 11/01/00 | 99/99/99 | 14.17 | 10/20/00 | JLW |
| | AA07 | BASED ON THE AA MARKET MINUS 7 CENTS | 11/10/00 | 99/99/99 | 1.725 | 11/14/00 | JH |

FIG. 13

| THE TRADER SYSTEM | | | | |
|---|---|---|---|---|
| HOME \| INQUIRY \| MAINTENANCE \| SETTLEMENT \| SETTINGS \| NEWS \| LOGOUT \| ABOUT | | | | |
| ☐☐ | CONTACTS \| SCHEDULES \| PRODUCTS \| PRICING \| TRANSPORTATION | | | |
| | MARKET PRICES \| PRICING HISTORY \| CALCULATOR \| OTHER LINKS | | | |
| PRICE BASIS | BACK  11 HISTORY RECORD(S) FOUND | | | |
| ☑ CODE | EFFECTIVE FROM | EFFECTIVE TO | MARKET PRICE | LAST UPDATE | UPDATED BY |
| FIND | 11/01/00 | 99/99/99 | 14.92 | 10/20/00 | JLW |
| | 10/01/00 | 10/31/00 | 14.99 | 09/22/00 | JLW |
| | 09/01/00 | 09/30/00 | 14.94 | 08/21/00 | JLW |
| | 08/01/00 | 08/31/00 | 15.05 | 07/26/00 | JLW |
| | 07/01/00 | 07/31/00 | 15.56 | 06/28/00 | JLW |
| | 06/01/00 | 06/30/00 | 14.8 | 05/25/00 | JLW |

| | | | SETTLED | SETTLED | | | |
|---|---|---|---|---|---|---|---|---|
| ORDER | LOAD TYPE | STATUS | RATE | WEIGHT | TEST | MILES | SHIP DATE | ARRIVE DATE |
| BRD 185-001 (2608) | STANDING ORDER AUTO EXTEND (MIRROR WEEK) | APP'D | 0 | 0 | 0 | 0 | MONDAY 11/13/00 | MONDAY 11/13/00 |
| BRD 185-001 (2612) | STANDING ORDER AUTO EXTEND (MIRROR WEEK) | APP'D | 0 | 0 | 0 | 0 | TUESDAY 11/14/00 | TUESDAY 11/14/00 |
| BRD 185-001 (2616) | STANDING ORDER AUTO EXTEND (MIRROR WEEK) | APP'D | 0 | 0 | 0 | 0 | WEDNESDAY 11/15/00 | WEDNESDAY 11/15/00 |

☐ TRANSPORTATION DETAIL
13 SCHEDULE(S) FOUND
SELLER: BREWSTER DAIRY, INC. (BREWSTER, OH)
SHIP FROM: BREWSTER DAIRY-MICHIGAN (MISHIGAN, MI)
BUYER: KEEBLER CO. (FREMONT, OH
SHIP TO: KEEBLER CO. (FREMONT, OH)
HAULER: HOMAN TRANSPORTATION (MONROEVILLE, OHIO)
PRODUCT: WHOLE MILK FO CLASS III GRADE A COOLED DOWN

FIG. 16

FIG. 17

THE TRADER SYSTEM

HOME | INQUIRY | MAINTENANCE | SETTLEMENT | SETTINGS | NEWS | LOGOUT | ABOUT

| LOADS | INVOICES |
|---|---|

◉ SELLERS VIEW   ○ BUYERS VIEW

| BUYER | PRODUCT | CONFIRMATION NUMBER | SHIP FROM | SHIP TO | SHIP DATE | BILL LADING | COMMISSION | EST WT. | SETTLED WT. |
|---|---|---|---|---|---|---|---|---|---|
| (DFE) DEAN FOODS COMPANY EVART, MI | (WH02) WHOLE MILK FO CLASS III GRADE A COOLED DOWN | BRD204-111 (0001) | BME | DFE | 11/14/00 | | | 48,000 | 0 |
| | | BRD204-111 (0001) | BME | DFE | 11/16/00 | | | 48,000 | 0 |
| | | BRD204-111 (0001) | BME | DFE | 11/17/00 | | | 48,000 | 0 |

76

MONTH
[NOVEMBER ▼]
SETTLED STATUS
○ ALL
◉ UNSETTLED
○ SETTLED
CONTACT
[          ]
☑ CODE 🔍
[FIND]

FIG. 20

| THE TRADER SYSTEM | | | | | |
|---|---|---|---|---|---|
| HOME | INQUIRY | MAINTENANCE | SETTLEMENT | SETTINGS | NEWS | LOGOUT | ABOUT | | | | | |

☐☐  | LOADS | INVOICES |

MONTH
NOVEMBER▽
SETTLED STATUS
○ ALL
◉ NOT INVOICED
○ INVOICED
CONTACT
[   ]
☑ CODE 🔍

[ FIND ]

88 SELLER(S) FOUND — 78

SELLERS THAT NEED TO BE INVOICED IN NOVEMBER

| CODE | NAME | CITY | STATE | SETTLED? |
|---|---|---|---|---|
| ADP | AGRI-DAIRY PRODUCTS, INC. | PURCHASE | NY | YES |
| AGM | AGRI-MARK, INC. | LAWRENCE | MA | NO |
| ACR | ALTO DAIRY COOP. | WAUPUN | WI | YES |
| ASN | ASSOCIATED MILK PRODUCERS, INC. | NEW ULM | MN | YES |
| BCC | BAKER CHEESE COMPANY | ST. CLOUD | WI | NO |
| BPM | BARBER PURE MILK, INC. | BIRMINGHAM | AL | YES |
| ZNH | BONGRAIN U.S. CHEESE GROUP | NEW HOLLAND | PA | NO |
| BRD | BREWSTER DAIRY, INC. | BREWSTER | OH | NO |

FIG. 21

COMPUTERIZED COMMISSION BASED TRADING OPERATIONS

CROSS-REFERENCE TO RELATED APPLICATIONS

The present application is a divisional of U.S. patent application Ser. No. 09/773,803 filed on Feb. 2, 2001, now abandoned from which priority is claimed, and which is herein incorporated by reference.

STATEMENT REGARDING FEDERALLY SPONSORED RESEARCH

Not Applicable.

BACKGROUND OF THE INVENTION

The present invention relates generally to a computerized system for facilitating the purchase of a product from a seller and the sale of the product to a buyer through an intermediary, and more particularly to the processing of requests for quotations for goods and/or services from buyers and for the linking of the buyers to sellers through an intermediary broker utilizing a centralized computer in communication with a communications network such as the Internet.

Buyers in need of goods, particularly in the dairy product field, often spend considerable time locating an appropriate seller or vendor for the product which they require, and commonly utilize a intermediary broker to eliminate the need for the buyer to locate, purchase, and arrange for the transport of the goods. Similarly, vendors in the dairy product field must find buyers for their products quickly, as dairy products are a perishable goods. Rather than locating individual buyers, vendors utilize the same intermediary brokers as the buyers, thereby facilitating the exchange of the goods.

Traditionally, an intermediary broker functions as a central clearing house for the goods in which they specialize. The broker establishes contact with a wide range of vendors, purchasing goods at a "buy price" to establish a suitable "supply." The broker next identifies suitable buyers in need of the goods which the broker has purchased, and arranges for the sale and transport to the of the goods to the buyer at a premium "sale price," resulting in a small profit to the broker on each transaction, a portion of which is paid to the broker's agent in the form of a commission. Ideally, the broker never assumes actual possession of the goods, and rather, is able to arrange for the sale and transport of the goods within a very short period of time, such that the goods are delivered directly from the seller to the buyer, without an intermediate stop at the buyer's storage facility.

Traditionally, the operation of the intermediary broker is carried out over the telephone, with agents of the broker contacting sellers to locate supplies of goods and to purchase goods, and contacting buyers to identify the need for particular goods and to close sales. Furthermore, agents of the brokers may receive unsolicited calls from buyers in need of a particular good, or from sellers who find themselves with a surplus of goods which must be sold in a short period of time.

Conventional general purpose computers utilized by brokers and their agents for maintaining a record of buyers and sellers may provide limited access to a network of computers (e.g., LAN) or to the Internet. However, traditional product brokerage systems generally do not integrate the Internet into the associated brokerage software so as to provide an integrated framework through which the buyers, sellers, and brokers may communicate and conduct business via the general purpose computer. Therefore, it is desirable to develop a traded goods brokerage system which integrates local or global computer networks such as the Internet into the brokerage software to provide an integrated system for tracking buyers, sellers, haulers, and products.

In the dairy product field, it is not uncommon to find a surplus of goods in one region of the country (or world) such as a rural or primarily agricultural region, and a demand in another region of the country, such as an urban or densely populated area. The agents of the intermediary broker must be continually made aware of the fluctuations in regional supply and demand for the goods, limitations on transportation distances and time requirements, as well as fluctuations in regional prices. As with any profit-driven business, agents of the intermediary broker desire to purchase the goods at a lower prices, and sell the goods at a premium price, factoring in the cost of transportation from the seller to the buyer.

Accordingly, for an agent of the intermediary broker to complete a transaction, the agent requires access to a large amount of accurate and up-to-date information detailing the current market conditions, buyer information, and seller information. Such information is traditionally stored in a central computer database at the intermediary broker, requiring manual entry of information as it becomes available to the agents.

Therefore, it is desirable to develop a brokerage system that integrates local or global computer networks such as the Internet into the system software to provide a more efficient and accurate system than is currently available by facilitating access to, and acquisition of, the most current and up-to-date information available pertaining to product pricing, availability and transportation. The present invention is an improvement to the traditional computerized system for use by intermediary brokers, providing a plurality of user interfaces for accessing filtered information and for exchanging information pertaining the purchase, sale, and transportation of goods, such as dairy products, over the Internet between the buyers, sellers, and agents of the intermediary broker.

The foregoing and other objects, features, and advantages of the invention as well as presently preferred embodiments thereof will become more apparent from the reading of the following description in connection with the accompanying drawings.

BRIEF SUMMARY OF THE INVENTION

Briefly stated, the present invention is a computerized information storage, filtering and presentation system configured to facilitate the function of intermediary broker agents in the purchasing and sale of consumable and perishable products, such as dairy goods. The computerized system provides agents of the intermediary broker with filtered information via a communications network identifying the sellers of particular goods, current market purchase prices, and transportation costs for various regions. The computerized system further provides the agents with additional filtered information via the communications network identifying buyers for particular goods and current market selling prices, enabling the agents to efficiently match goods purchased from a seller to a buyer's demand while achieving a desired profit margin.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 1b is a continuation of the work flow chart of FIG. 1a;

FIG. 1c is a continuation of the work flow chart of FIG. 1a;

FIG. 1d is a continuation of the work flow chart of FIG. 1a;

FIG. 4 is an illustration of a graphical user interface for displaying individual contact information;

FIG. 5a is an illustration of a graphical user interface for displaying a first portion of corporate contact information;

FIG. 5b is an illustration of the graphical user interface of FIG. 5a, displaying the second portion of corporate contact information;

FIG. 5c is an illustration of the graphical user interface of FIG. 5a, displaying a hierarchical tree of associated contact information for a selected contact;

FIG. 5d is an illustration of the graphical user interface of FIG. 5a, displaying a window of attached documents associated with a selected contact;

FIG. 6 is an illustration of a graphical user interface for displaying selection criteria for filtering goods shipment schedules;

FIG. 7 is an illustration of a graphical user interface for displaying filtered goods shipment schedules;

FIG. 8 is an illustration of a graphical user interface for displaying confirmation information for a selected goods shipment;

FIG. 9 is an illustration of a graphical user interface for displaying selection criteria for filtering goods and product information;

FIG. 10 is an illustration of a graphical user interface for displaying filtered goods and product information;

FIG. 11 is an illustration of a graphical user interface for displaying the buyers of a selected good and/or product;

FIG. 12 is an illustration of a graphical user interface displaying market pricing information for goods and products;

FIG. 13 is an illustration of a graphical user interface displaying pricing history for a selected entity;

FIG. 16 is an illustration of a graphical user interface displaying a transportation detail window;

FIG. 17 is an illustration of a graphical user interface providing access to maintenance and data entry screens;

FIG. 20 is an illustration of a graphical user interface displaying a detailed information sheet for a load settlement; and FIG. 21 is an illustration of a graphical user interface displaying a filtered load settlement invoice report.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Throughout the following description, the term "interactive link" is intended to describe embedded information associated with a display of specific information in a graphical user interface of a computer system. Selection of the displayed specific information, for example, a highlighted name or button, by the user through a conventional interface, signals the computer system to access the embedded information, and to execute a specific set of instructions associated therewith. Such embedded information may direct the computer system to display additional information to the user in the graphical interface, to access stored data, or to perform one or more specified functions.

Figure 1A:
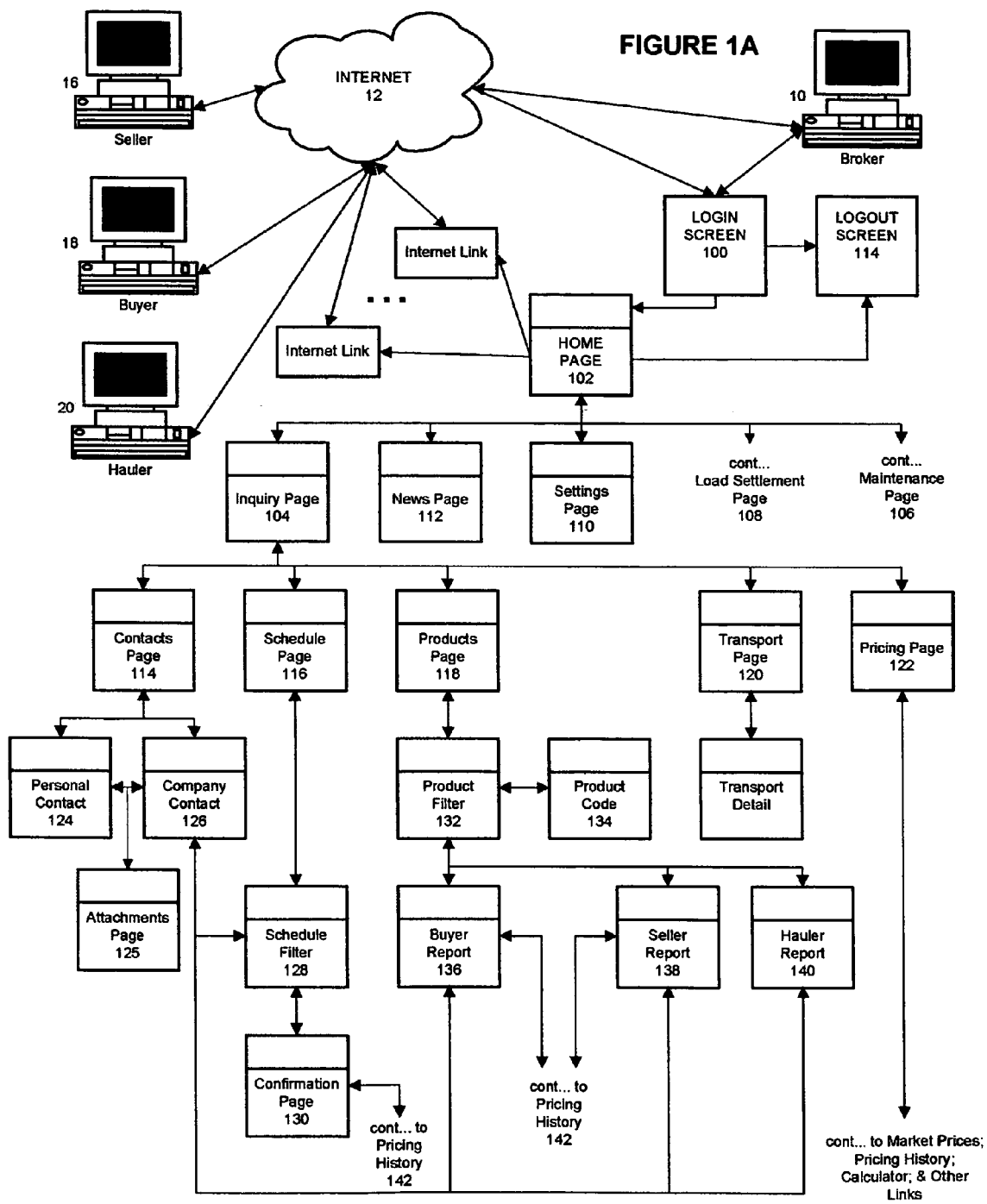
FIG. 1a is a work flow chart illustrating the relationships between the graphical user interfaces of the present invention.
Figure 1B:
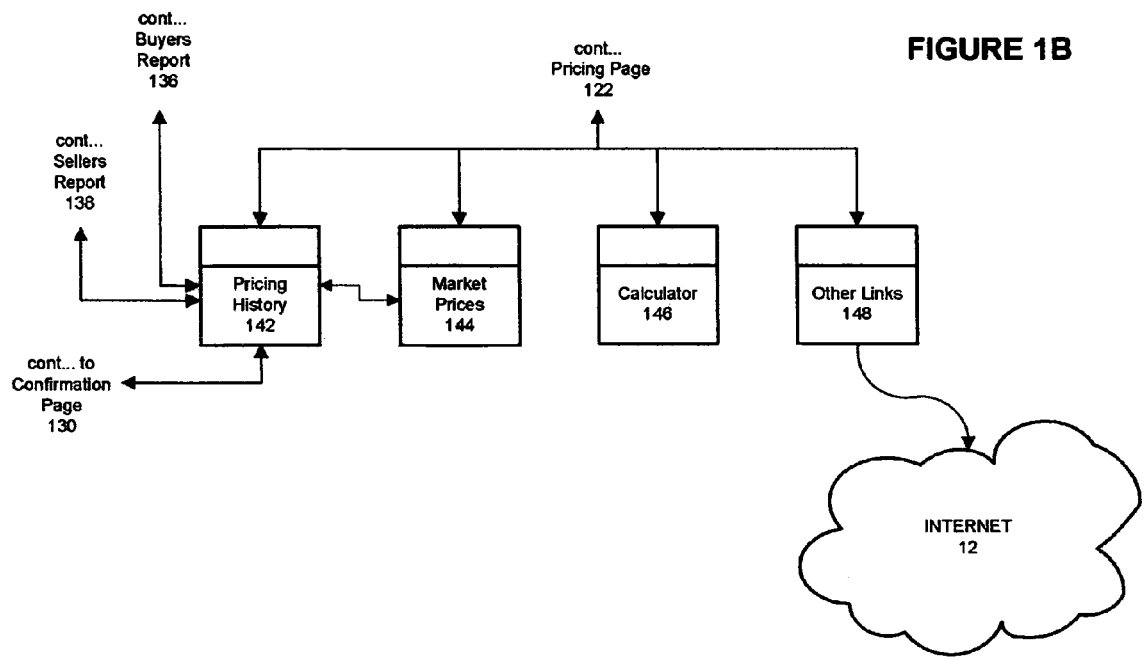
Figure 1C:
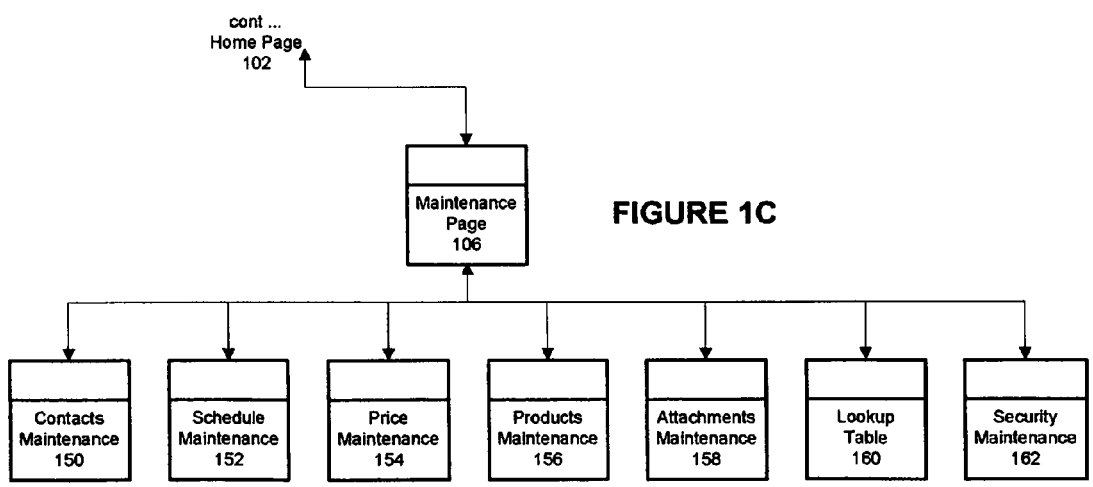

Updated information is critical to maintaining profitability for an intermediary broker or trader in the purchasing, sale, and transportation of goods such as dairy products. As illustrated in FIGS. 1a and 1b, in order to receive the most current information on buyers, seller, haulers, and product pricing, the information can be stored centrally on a broker's e-commerce server data processing system or computer accessible via a communications network, such as the Internet. In this manner, the information can be updated and altered at a central location as soon as the new data becomes available, eliminating delays in sending updated information to numerous individual users. Thus, in the preferred embodiment, a host broker computer is adapted to allow for data communication with one or more-remote computers, such as a seller's computer, buyer's computer, or hauler's computer, via a communications network such as the Internet. It is understood that a conventional protocol for communicating with a local or global computer information network such as the Internet is implicit in the interconnection between each computer, which may be running an Internet browser application such as Internet Explorer from Microsoft or Netscape Communicator, the broker's e-commerce server data processing system which may be setup as an Internet web-server, and the communications network. In the case of a global communications network, the transmission control protocol/internet protocol (TCP/IP) presently is the preferred protocol, although it will be appreciated that protocols such as HTML and XML may be implemented and utilized without altering the scope of the invention. Each computer connects to the network using software residing on the computer, and access information stored on the broker's e-commerce server data processing system. It may be desirable for the broker's e-commerce server data processing system to verify the identity of the accessing user or computer before allowing access to the data on the broker's e-commerce server data processing system. This identity verification can be implemented through either software or hardware in a conventional manner.

Turning to FIGS. 1a and 1b, a flow-chart guide to the components of the preferred embodiment of the present invention is illustrated. A broker workstation 10 is linked to a communications network such as the Internet 12 and to an e-commerce server data processing system or computer 14 configured to provide transactional information and data. Optionally, one or more seller workstations 16, buyer workstations 18, and hauler workstations 20 may be linked to the e-commerce server data processing system or computer 14 via the Internet. Sellers, buyers and haulers may utilize the e-commerce serve data processing system to gather product and sales information, transact business, and send or receive transaction confirmations and financial data.

Upon accessing the e-commerce server data processing system or computer 14, the user, such as a broker workstation 10, is presented with a Login Screen (Box 100) requiring user identification and password. In the preferred embodiment, the Login Screen (Box 100), and all other informational screens provided to a user from the e-commerce server data processing system or computer 14 are presented as graphical user interfaces, which may include one or more conventional interactive components such as buttons, links, or tabs associated with specific actions. The e-commerce server data processing system or computer 14 employs conventional security protocols to ensure that only authorized users may access the data stored thereon. Following a successful login by a user, a Home Page (Box 102) is presented to the user. Information displayed to the user by the Home Page (Box 102) may include a welcome message, version information, news, or other information pertinent to the user.

Figure 2:
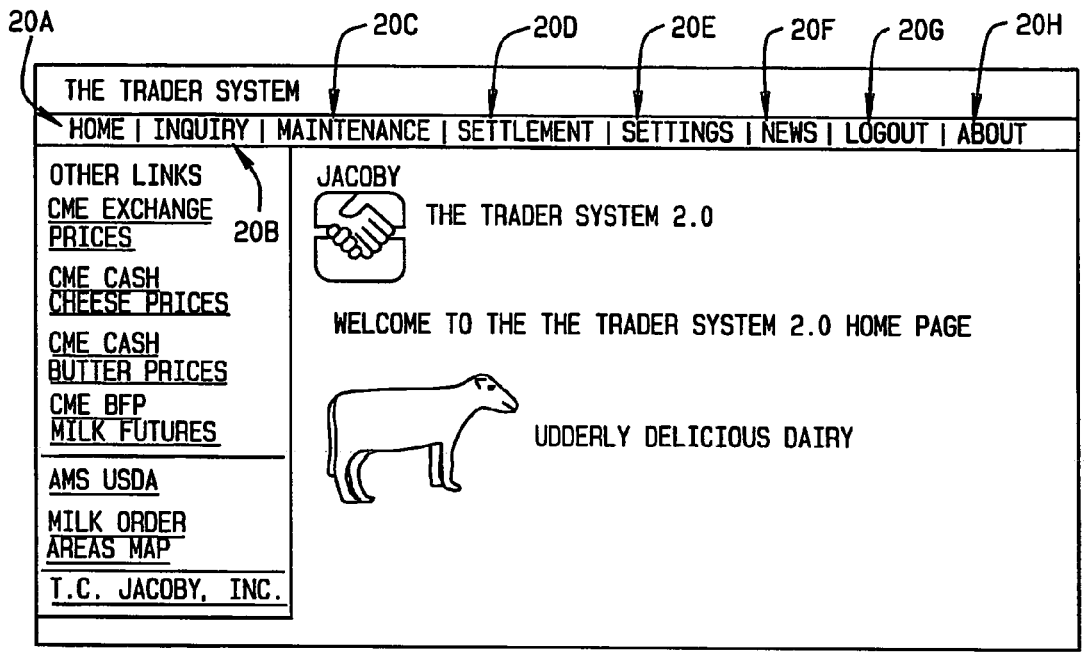
FIG. 2 is an illustration of a home page graphical user interface to the e-commerce server data processing system of the present invention.

To access the information stored on the e-commerce server data processing system or computer 14, the user may select an interactive component such as a tab or drop-down menu item to view an Inquiry Page (Box 104), a Maintenance Page (Box 106), a Settlement Page (Box 108), a Settings Page (Box 110), News (Box 112), or to log out of the system (Box 114). As seen in FIG. 2, in the preferred embodiment, these interactive components are provided in the form of selection tabs 20a-20h in a menu bar 22 at the top of the graphical user interface. Selection of one or more of these interactive components 20a-20h may be blocked by the e-commerce server data processing system or computer 14 depending upon the user's level of security clearance. For example, buyers, sellers, and haulers may not be permitted to select the Maintenance Page (Box 106) or Settlement Page (Box 108), and accordingly, the associated interactive components 20c and 20d will be deactivated for such users.

Selection of the "Home" interactive component 20a will return the user to the Home Page (Box 102) presented upon login to the e-commerce server data processing system 14.

Figure 3:
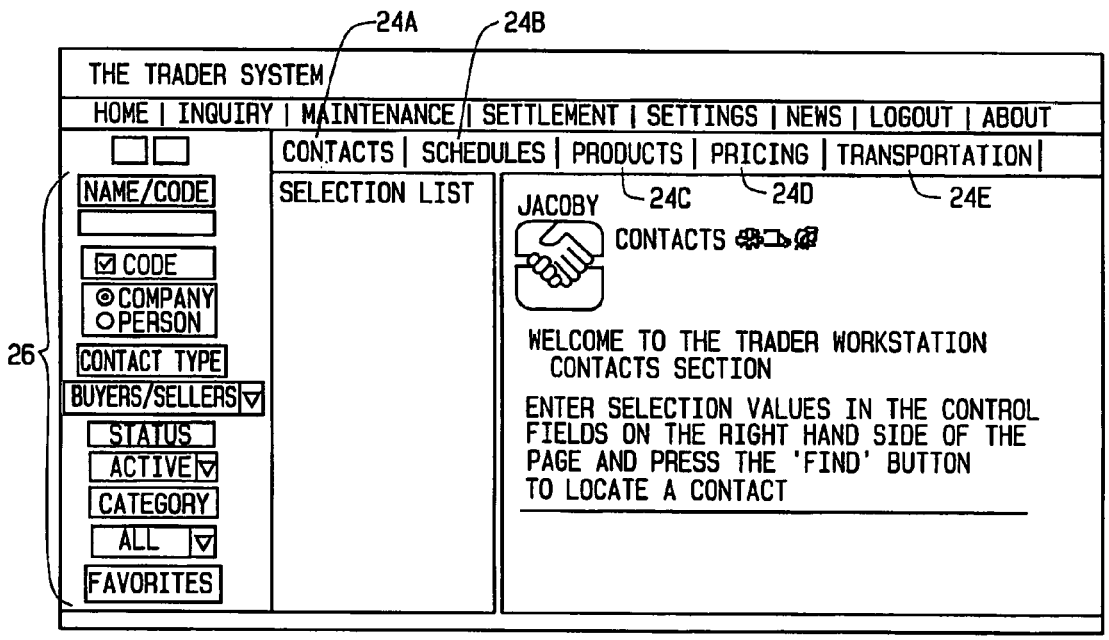
FIG. 3 is an illustration of a graphical user interface for facilitating selection of a plurality of contact inquiries or information filters.

As seen in FIG. 3, selection of the "Inquiry" interactive component 20b presents the user with additional interactive components, such as a tab or drop-down menu item to view a Contacts Page (Box 114), a Schedules Page (Box 116), a Products Page (Box 118), a Pricing Page (Box 120), or to view a Transportation Page (Box 122). In the preferred embodiment, these interactive components are provided in the form of selection tabs 24a-24e below the menu bar 22. By default, as seen in Figure 3, the first interactive component 24a associated with the Contacts Page (Box 114) is automatically selected upon display of the inquiry page. The Contacts Page (Box 114) provides the user with access to both corporate and individual contact information stored on the e-commerce server data processing system 14. A conventional interactive interface 26 is provided for the user to enter filter information utilized to retrieve stored contact information. For example, the user may search for a contact by the contact name/code, the contact type (buyer or seller), the contact status, or by the contact category. Alternative search parameters may be provided within the scope of the invention. FIG. 4 illustrates the displayed results of a search for an individual contact stored on the e-commerce server data processing system 14. The displayed results are preferably presented in a separate Personal Contact window (Box 124) of the graphical user interface, and the information displayed may include interactive links to telephone numbers for a telephone auto-dialer, email addresses, or Internet web-site links. Additional contact information, including but not limited to names, addresses, contact codes, and update information may be included in the displayed results.

Turning to FIGS. 5a and 5b, the displayed results of a search for corporate contacts matching the filter criteria input into the interface 26 located on the e-commerce server data processing system 14 are shown in a results column 30 of the graphical user interface. Adjacent the displayed results, a detailed listing 32 of the contact information for a single corporate contact selected from the results column 30 is displayed in a company contact column (Box 126). The detailed listing provides the user with conventional contact information for the selected corporation, including the names of individuals, telephone numbers and addresses. Interactive links associated with the names of individuals presented in the corporate contact information will display an individual contact in a Personal Contact window (Box 124) as described above. Additional interactive links may be provided for phone numbers, email addresses, and corporate web-sites accessed via the Internet.

Additionally provided with each detailed listing 32 of corporate contact is a menu bar 33 comprising a plurality of interactive component buttons. Included on the menu bar 33 is a hierarchical tree interactive component button 35 for selecting a hierarchical tree view of associated contacts, as seen in FIG. 5c. Associated contacts may include individual plants, warehouses, or hauling companies which are part of a larger corporate structure. The hierarchical tree information is displayed in the results column 30, as interactive links permitting the user to access contact information for each of the associated contacts. The user may further expand the display of associated contacts to include, as subordinate entries on the hierarchical tree, individuals associated with each corporate entity displayed on the list, or may compress the hierarchical tree information to display only directly superior or subordinate corporate contacts. The hierarchical view further permits the user to subdivide the display of a large corporate contact geographically, or by the types of products which are produced. For example, a large corporate contact in the dairy business may include several subsidiary corporations, each responsible for a different aspect of the business, such as milk production or cheese production. Displaying this information in a hierarchical tree structure allows the user to filter contact information to extract relevant data.

An attachment interactive component button 37 displayed in the menu bar 33 permits the users to associate or "attach" a stored document or data record with a specific contact. Information associated with a contact may be stored on the e-commerce server data processing system or computer 14, or may be accessible over the Internet through a suitable link. Selection of the attachment button 37 results in the display, to the user, of an attachment windows 39 (Box 125), shown in FIG. 5d containing a list of all documents or records attached to the current contact. The user may select one or more of the displayed documents or records for review or editing, or may insert or delete additional attachments. For example, an attachment list displayed in the attachment window 39 may include a picture file, a text file, a spreadsheet, or scanned images of contracts, certificates, or phone journals. In this manner, the user is provided with access to additional information specific to the current contact displayed in window 32.

Additional interactive buttons included on the menu bar 33 may include a "print" button 41, and an "add" button 43, and a "delete" button 45. Selection of the "print" button 41 directs the e-commerce server data processing system or computer 14 to produce a printed copy of the contact information currently displayed in window 32. Selection of the "add" or "delete" buttons 43, 45 causes the e-commerce server data processing system or computer 14 to add or delete the contact currently displayed in window 32 to a stored list of "favorites" associated with the current user. The stored "favorites" lists is utilized by the user to provide rapid access to information which is utilized on a regular basis. For example, individual users may only be responsible for handling accounts with specific sellers and buyers, and hence will frequently refer to contact information associated with those buyers and sellers. A stored "favorites" list facilitates this by providing a listing of the commonly accessed information.

Turning to FIG. 6, selection of the second interactive component 24b associated with the Schedules Page (Box 116) presents the user with an interactive filter window 34 for displaying desired product or goods shipment and transport schedules. By selecting desired criteria, the user can search for and locate specific goods shipment schedules matching the selected criteria stored in the e-commerce server data processing system 14. Selection criteria may include, but are not limited to, the particular shipping entity (broker, buyer, seller, or hauler), shipment dates, schedule types (Ship From, Ship To), the product type, the contact type, the identification of the responsible broker agent, or specific remarks. Additionally, the user may select the format in which the results of the search are displayed (Box 128) through the use of interactive components in the Schedules Page graphical interface. For example, the user may select a Detail View, identifying all information pertaining to a particular set of shipment schedules, a Remarks View in which only stored remarks are displayed, or a Confirmation View, in which only order confirmation information associated with a shipment schedule is displayed (Box 128).

Shipment schedule information matching the input selection criteria for a specific corporate entity, for example, T. C. Jacoby & Co. is illustrated in FIG. 7 displayed in the Detail View format. The information preferably includes order parameters (Confirmation No. and Status), shipping parameters (From City, Ship Date, Ship Time, To City, Arrive Date, and Arrive Time), seller parameters (Ship From), buyer parameters (Ship To), product parameters (Product, Load Type), and hauler parameters (Carrier). Information displayed may be in the form of an interactive link, for example, the buyer, seller, and hauler parameters provide interactive links to displays of corporate contact information as set forth above. Similarly, the product parameters may provide an interactive link to the products page (Box 118), described below. The order parameters may provide a link to an order Confirmation Page (Box 130), illustrated in FIG. 8.

The Confirmation Page (Box 130) provides the user with a new window 36 in the graphical user interface, and displays information associated with the confirmation of a specific shipment of goods from a buyer to a seller which has been arranged by the broker. Preferably, the confirmation page window 36 displays an order confirmation number, shipment information, product information, buyer, seller, and hauler information, and pricing information. Additional information related to a specific product order may be included in the confirmation page window 36. The confirmation page windows 36 may further include one or more interactive links configured to access additional information available on the e-commerce server data processing system 14, for example, an interactive link 38 for product pricing information is shown in confirmation page window 36.

Optionally, in addition to storing and displaying order confirmation information, the e-commerce server data processing system 14 may be configured to automatically transmit, by an electronic means such as facsimile or e-mail, order confirmation information to the parties involved in a completed transaction.

Turning to FIG. 9, selection of the third interactive component 24C associated with the Products Page (Box 118) presents the user with an interactive filter window 40 for displaying desired product information. Through the interactive filter window 40, the user may selectively search for product information on the e-commerce server data processing system 14 by either the name or code of the product, or by the category of the product. FIG. 10 illustrates the displayed results of a search for a product by category. The search results are displayed in the graphical user interface in a tabular format (Box 132), including interactive links to access additional information available on the e-commerce server data processing system 14. For example, as seen in FIG. 10, interactive links are provided for the user to access additional information pertaining to the product code (Box 134), the product buyers (Box 136), sellers (Box 138), and haulers (Box 140). Selection of an interactive link associated with a product buyer, seller, or hauler will display a list of entities associated with the product. As seen in FIG. 11, a list of buyers associated with a selected product is displayed (Box 136) in response to the activation of a buyer interactive link by the user in the product. search results display. Similar listings are provided by the system of the present invention in response to the selection of a seller or hauler interactive link by the user in the product search results display. The displayed lists of buyers, sellers, or haulers associated with a selected product provide the user with additional interactive links to displays of company contact information (Box 126) as described above, or product pricing history (Box 142), described below.

As seen in FIG. 12, selection of the "Pricing" interactive component 24d presents the user with additional interactive components, such as a tab or drop-down menu item to view Market Prices (Box 144), Pricing History (Box 142), a Pricing Calculator (Box 146), or to view a listing of links to external pricing information (Box 148) available over the Internet 12. In the preferred embodiment, these interactive components are provided in the form of selection tabs 42a-42d below the selection tabs 24a-24e. By default, as seen in FIG. 12, the first interactive component 42a associated with the Market Prices (Box 144) is automatically selected upon display of the pricing page in the user interface. Information displayed to the user upon selection of the Market Prices interactive component 24d includes, but is not limited to, a price basis code, a product description, price dates (i.e., effective from date, effective to date, update date), the current market price, and information identifying the broker agent who last updated the information on the e-commerce server data processing system 14. The displayed information for the Market Prices may include one or more interactive links to additional information stored on the e-commerce server data processing system 14. For example, selection of the price basis code for an individual product will provide the user with pricing history for the individual product (Box 142).

Turning to FIG. 13, selection of the tab 42b for Pricing History (Box 142) displays a pricing history report 44 for a selected product, and provides an interactive filter window 46 through which the user may identify a product for which the pricing history records stored on the e-commerce server data processing system 14 will be displayed in the pricing history report 44. Optionally, the interactive filter window 46 may provide the user with interactive components permitting the filtering of price histories by buyer, seller, hauler, dates, or purchase information. The pricing history report 44 displayed in the graphical user interface optionally may include one or more interactive links to additional information stored in the e-commerce server data processing system 14. For example, a pricing history report 44 displaying information for a specific product buyer may include interactive links to order confirmation information (Box 130) for each product order shown in the report 44.

Figures 14, 15:
FIG. 14 is an illustration of a graphical user interface calculating pricing parameters for goods and/or products.
FIG. 15 is an illustration of a graphical user interface displaying transportation information for goods.

Turning to FIG. 14, selection of the tab 42c for Calculator (Box 146) displays an interactive product price calculator 50. The interactive product price calculator provides fields into which the user may enter product pricing parameters, hauling parameters, and load parameters. Product pricing parameters may include items such as the product code, the price type, the market price basis, the price function, and the price factor. Hauling parameters may include the identification of the responsible party, the rate type, the load type and the distance over which the product is to be transported. Load parameters may include items such as the shipping date for the product, the estimated weight of the product, and the estimated test of the product. A "calculate" button 52 is provided on the price calculate 50. Responsive to the entry of the required data fields by the user, and the selection of the "calculate" button 52, the e-commerce server data processing system 14 processes the provided information to produce an estimated product cost associated with the data provided by the user.

The final interactive tab, 42d for the pricing options, presents the user with a display of interactive links (Box 148) to one or more external information resources accessible via the Internet 12. These may include interactive links to web sites displaying current market activity, such as international exchanges or markets.

Selection of the "Transportation" interactive component 24e, as shown in FIG. 15, presents the user with an interactive filter window 54 and a hauling report window 56. Through data entry fields in the interactive filter window 54, the user may enter filter information utilized to retrieve hauler information from the e-commerce server data processing system 14. Retrieved hauler information is displayed in the hauling report window 56, preferably in tabular form, listing buyer, seller, ship from, and ship to information, together with an interactive link 58 to the specific details associated with each shipment. Interactive links may be further provided to the corporate contact information (Box 126) for each buyer and seller listed in the hauler information report. Selection of the interactive link 58 opens a Transportation Detail window 60 in the graphical user interface, as seen in FIG. 16, and displays detailed transportation information associated with the selected hauling record. For example, the detailed transportation information displayed in the Transportation Detail window 60 may include an interactive link to individual order confirmation information (Box 130), the hauling parameters such as load type, statue, rate, weight test, distance, and shipping information such as departure and arrival dates. Additional links may be provided to the corporate contact information (Box 126) for the buyer, seller, and hauler, and to access product information (Box 132).

Turning to FIG. 17, selection of the interactive tab 20c in the menu bar 20 at the top of the graphical user interface results in the display of the Maintenance Home Page (Box 106), providing the user with access to a variety of data entry pages. The display of the Maintenance Home Page presents the user with a maintenance menu bar 62, comprising a plurality of interactive maintenance tabs 64a-64h. Maintenance tab 64a provides an interactive link which returns the user to the Home Page 102. Maintenance tabs 64b, 64c, 64d, and 64e provide interactive links to data entry pages for contact information (Box 150), schedule information (Box 152), price information (Box 154), and product information (Box 156), respectively. Upon selection of one of these maintenance tabs, the user is presented with conventional data filters for the associated topic, and one or more data entry windows permitting alteration, insertion, and deletion of data stored on the e-commerce server data processing system 14.

Selection of maintenance tab 64f provides access to the maintenance page for attached documents and data (Box 158) associated with contact information, while selection of maintenance tab 64g provides access to the maintenance page for the lookup tables (Box 160). Maintenance for the lookup tables provides access to system-level information, used to define ranges of valid values for fields in the databases stored on the e-commerce server data processing system or computer 14. These values may be changed or updated at any time.

Finally, selection of maintenance tab 64h provides access to the maintenance page for the security (Box 162) of the e-commerce server data processing system 14. The security page (Box 162) presents the user with a variety of conventional options for regulating access to the e-commerce server data processing system 14 by different users. For example, buyers 18 accessing the e-commerce server data processing system 14 from the Internet 12 may be permitted only to access data available through the Inquiry Page (Box 104), but not to any other information. Similarly, haulers 20 accessing the e-commerce server data processing system 14 from the Internet 12 might only be permitted to access information related to the transportation of goods, and denied access to any pricing information for the products which they are hauling. In contrast, a broker's agent accessing the e-commerce server data processing system 14 directly from a terminal 10 may be granted unlimited security access to all aspects of the e-commerce server data processing system 14.

Figure 1D:
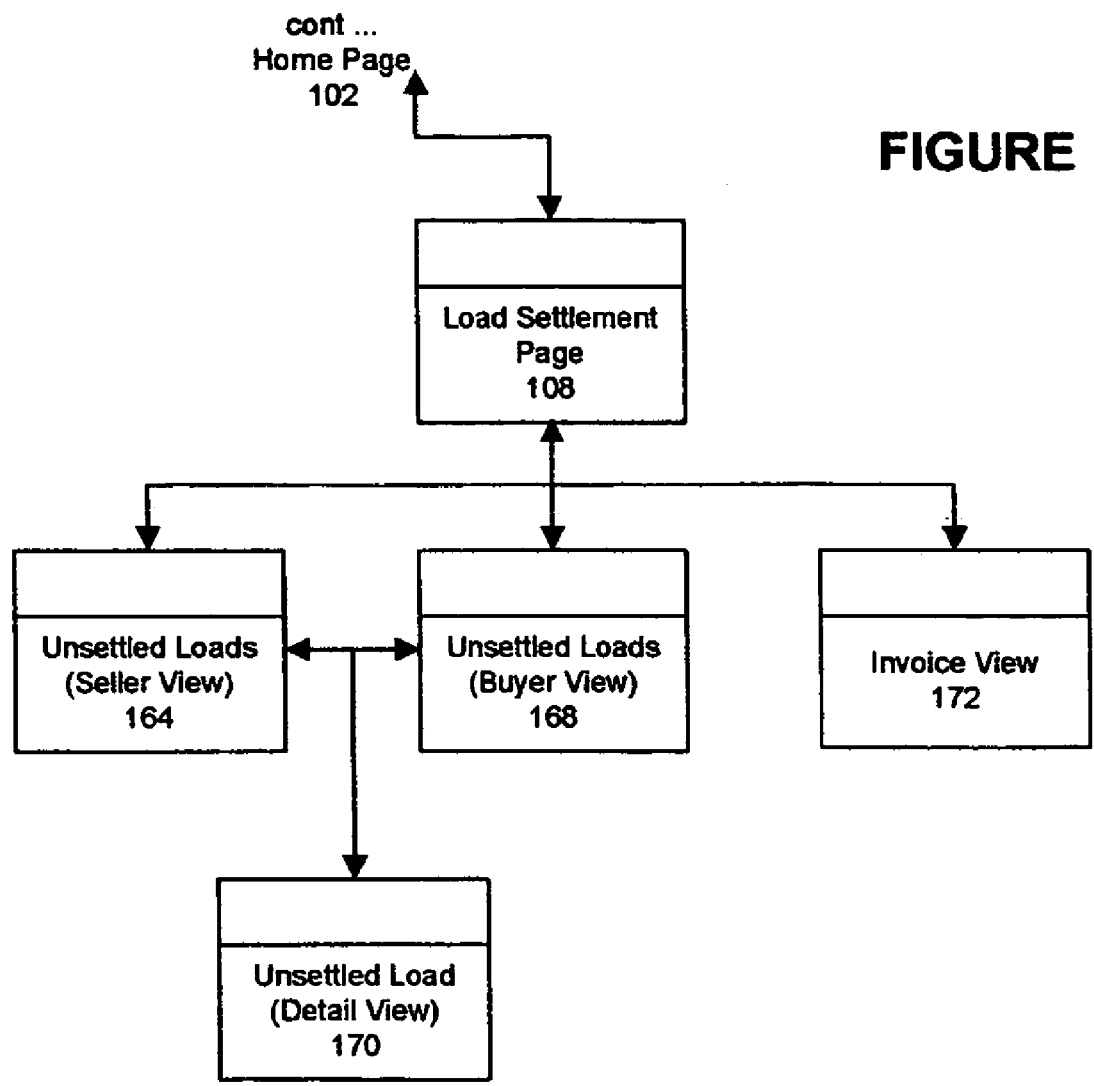
Figures 18, 19:
FIG. 18 is an illustration of a graphical user interface providing access to load settlement screens.
FIG. 19 is an illustration of a graphical user interface displaying a filtered load settlement report.

Turning to FIG. 18, selection of the interactive tab 20d in the menu bar 20 at the top of the graphical user interface results in the display of the Load Settlement Home Page (Box 108), shown in FIG. 1d, providing the user with access to a variety of report pages. The display of the Load Settlement Home Page presents the user with a settlement menu bar 68, comprising a plurality of interactive settlement tabs 70a and 70b together with a conventional interactive interface 71 for the user to enter filter information utilized to retrieve stored load settlement information. The conventional interactive interface 71 permits the user to retrieve stored information stored by month, or by load settlement status, i.e. all, unsettled, or settled. A "Contacts" field is additionally provided in the interface 71, into which the user may enter a contact code for access to either the personal contact page (Box 124) or company contact page (Box 126) associated with the entered code.

Selection of settlement tab 70a provides the user with a load report 74, as seen in FIG. 19, based upon the parameters input into interface 71. The displayed report may be from either a seller's perspective (Box 164) or a buyer's perspective (Box 168), as determined by the user's selection of an associated interactive component 72a or 72b, respectively. Prior to a weight determination and the testing of a dairy product to be shipped, the shipping load is considered "unsettled". The user calls the buyer and the seller of the shipping load to get each weight and test results and then negotiates a settlement, after which the shipping load is considered to be "settled". Accordingly, the user may chose, through selection in the interface 71, to view all loads, only unsettled loads, or only loads whose weight and test have been settled.

For each displayed load, an associated detail button 75 provides access to an expanded detail view 76 in a new detail window (Box 170) for the particular load, as seen in FIG. 20. The expanded detail view 76 provides the user with additional information identifying the buyer or seller, the product, the sale confirmation number, shipping information, commission information, and the load information. The detail view 76 may include one or more interactive links to additional information stored in the e-commerce server data processing system 14 or accessible over the Internet 12. For example, selection of an interactive link associated with an order confirmation will present the user with expanded order information as previously described.

Selection of settlement tab 70b provides the user with a load invoice report 78, as seen in FIG. 20, based upon the parameters input into an interface 80. The conventional interactive interface 78 is configured to permit the user to enter filter information utilized to retrieve stored load invoice information. Stored information may be sorted by month, or by load invoice status, i.e. all, invoiced loads, or loads which have not yet been invoiced. A "Contacts" field is additionally provided in the interface 80, into which the user may enter a contact code for access to either the personal contact page (Box 124) or company contact page (Box 126) associated with the entered code. A displayed load invoice report 78 provides the user with information identifying the invoice party, location information, and load status information. A load invoice cannot be generated before the load status information is settled, as described above. The load invoice report 78 may include one or more interactive links to additional information stored in the e-commerce server data processing system 14 or accessible over the Internet 12.

In the preferred embodiment of the present invention, the information presented to the user through the graphical user interface is in the form of an individual page of information, or self-contained code segment formatted for viewing on a computer system configured with a conventional web-browser application such as Netscape Communicator of Microsoft Internet Explorer.

As a process for facilitating a trading operating, the present invention provides a medium through which information related to buyers, sellers, haulers, products, and pricing stored on an e-commerce server data processing system 14 is accessible from one or more workstations connected via a local connection or remotely via the Internet. Sellers of a product may access the e-commerce server data processing system 14, and provide information identifying products offered for sale and the selling price. Buyers of a product may access the e-commerce server data processing system 14 to provide information identifying desired products, and haulers may access the e-commerce server data processing system 14 to provide information identifying their transportation routes and hauling rates.

A broker or broker's agent may utilize the e-commerce server data processing system 14 of the present invention to obtain contact information for buyers, sellers, or haulers, product information, pricing information, invoicing reports and transportation information. Information is presented to the user in a interactive format, providing interactive links from displayed information to additional relevant information stored on the e-commerce server data processing system 14 or accessible via the Internet 12.

Optionally, the e-commerce server data processing system 14 may be further configured to interact with one or more financial or accounting systems, thereby facilitating the handling of customer accounts and invoicing. Transactional information stored or entered into the e-commerce server data processing system 14, such as purchases, sales, and hauling contracts may be transferred to associated financial or accounting systems, wherein it is utilized to generate invoices or track accounts.

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or an other computer readable storage medium, wherein, when the computer program code is loaded into, and executed by, an electronic device such as a computer, micro-processor or logic circuit, the device becomes an apparatus for practicing the invention.

The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A computer readable medium encoded with program instructions executable by a computer to provide a set of application program interfaces executable on a networked computer system in conjunction with an application program for facilitating brokered commercial dairy product trading transactions comprising:

computer readable first program code means for providing a first interface for receiving dairy product transaction information from a broker and for displaying stored data in response to said received dairy product transaction information;

computer readable second program code means for providing a second interface for receiving dairy product load settlement information from said broker and for displaying stored dairy product load settlement data in response to said received dairy product load settlement information;

wherein said first interface optionally includes at least one interactive component for manipulating said displayed stored data;

wherein said second interface optionally includes at least one interactive component for manipulating said stored diary product load settlement data; and a computer readable third program code means for providing a third interface for accessing stored dairy product transaction information, including identification of at least one dairy product and product seller, together with stored dairy product load settlement information, including identification of at least one dairy product buyer, and for displaying information identifying, for a selected dairy product, available dairy product sellers and available dairy product buyers, together with commission data, enabling a third party broker to broker a commissioned dairy product trading transaction between at least one dairy product seller and at least one dairy product buyer.

2. The computer readable medium of claim 1 further including an additional computer readable program code means for providing an additional interface operatively associated with said third interface for receiving input contact information, said additional interface configured to display stored contact data in response to said received input contact information.

3. The computer readable medium of claim 1 further including an additional computer readable program code means for providing an additional interface operatively associated with said third interface for receiving input dairy product shipment schedule information, said additional interface configured to display stored dairy product shipment schedule data in response to said received input dairy product shipment schedule information.

4. The computer readable medium of claim 1 further including an additional computer readable program code means for providing an additional interface operatively associated with said third interface for receiving input dairy product information, said third interface configured to display stored dairy product data in response to said received input dairy product information.

5. The computer readable medium of claim 4 wherein said input dairy product information includes at least one data entry from the set of dairy product identifiers and dairy product categories.

6. The computer readable medium of claim 4 wherein said additional interface is further configured to display said stored dairy product information in combination with at least one interactive link to associated contact information selected from a set including at least one dairy product buyer, a plurality of dairy product sellers, and a plurality of dairy product haulers.

7. The computer readable medium of claim 1 further including an additional computer readable program code means for providing an additional interface operatively associated with said third interface for receiving input dairy product transportation information, said additional interface configured to display stored dairy product transportation data in response to said received input dairy product transportation information.

8. The computer readable medium of claim 7 wherein said additional interface is configured to display stored dairy product transportation information in combination with at least one interactive link to stored data selected from a set including dairy product transportation details, associated contact information for dairy product buyers, dairy product sellers, and dairy product haulers.

9. The computer readable medium of claim 7 wherein said additional interface is configured to display said stored dairy product transportation information in a hauling report, said hauling report selected from a set including a hauling history report and a hauling detail report.

10. The computer readable medium of claim 1 further including an additional computer readable program code means for providing an additional interface operatively associated with said third interface for receiving input dairy product pricing information, said additional interface configured to display stored dairy product pricing data in response to said received input dairy product pricing information.

11. The computer readable medium of claim 10 wherein said additional interface is configured to display said stored dairy product pricing information in a price report, said price report selected from a set including a current market price report and a price history report.

12. The computer readable medium of claim 1 further including an additional computer readable program code means for providing an additional interface configured to receive dairy product load settlement information; and
wherein said additional interface is configured to associate said received dairy product load settlement information with one or more customer account records.

13. The computer readable medium of claim 12 wherein said one or more customer account records are accessible through an accounting interface.

\* \* \* \* \*